(12) United States Patent
Picchi et al.

(10) Patent No.: US 11,130,514 B1
(45) Date of Patent: Sep. 28, 2021

(54) SANITARY SHOPPING CART HANDLE COVER

(71) Applicants: Laina Picchi, Powhatan, VA (US); Maria Picchi, Powhatan, VA (US)

(72) Inventors: Laina Picchi, Powhatan, VA (US); Maria Picchi, Powhatan, VA (US)

(*) Notice: Subject to any disclaimer, the term of this patent is extended or adjusted under 35 U.S.C. 154(b) by 0 days.

(21) Appl. No.: 16/984,253

(22) Filed: Aug. 4, 2020

(51) Int. Cl.
*B62B 5/06* (2006.01)

(52) U.S. Cl.
CPC .................................. *B62B 5/069* (2013.01)

(58) Field of Classification Search
CPC .................................. B62B 5/069; B62B 5/06
See application file for complete search history.

(56) References Cited

U.S. PATENT DOCUMENTS

| | | | |
|---|---|---|---|
| 6,543,794 B1 | 4/2003 | Tyree | |
| 6,869,085 B2 | 3/2005 | Pettigrew | |
| 7,222,817 B2 | 5/2007 | Stringer | |
| D746,531 S | 12/2015 | Barclift | |
| 9,676,406 B1 * | 6/2017 | Kocurek | B62B 5/069 |
| 2004/0021279 A1 | 2/2004 | Sobo | |
| 2006/0202438 A1 | 9/2006 | Helmy | |
| 2008/0191434 A1 | 8/2008 | Herron | |
| 2008/0191435 A1 | 8/2008 | Guercia | |
| 2009/0184146 A1 * | 7/2009 | Diccianni | B62B 3/146 224/411 |
| 2012/0240307 A1 * | 9/2012 | Terrell | B62B 5/069 2/158 |
| 2016/0297461 A1 * | 10/2016 | Barr-Perea | A45C 1/02 |

FOREIGN PATENT DOCUMENTS

WO 03045756 6/2003

* cited by examiner

*Primary Examiner* — John D Walters (57) ABSTRACT

The sanitary shopping cart handle cover covers the handle of a cart. The sanitary shopping cart handle cover forms a sanitary barrier that prevents pathogens living on the handle with infecting a client using the cart. The sanitary shopping cart handle cover incorporates a primary structure, a plurality of gloves, and a pocket. The plurality of gloves and the pocket attach to the primary structure. The primary structure covers the handle. The primary structure forms a barrier that prevents the transfer of a pathogen from the handle to a client. The pocket forms a sanitary storage structure that allows a client to store a domestic article without placing the domestic article within the containment space of the cart. The plurality of gloves are worn on the hands of the client. The plurality of gloves form personal barriers that prevent the pathogens from reaching the hands of the client.

20 Claims, 4 Drawing Sheets

SANITARY SHOPPING CART HANDLE COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including hand propelled vehicles, more specifically, an accessory specially adapted for a hand propelled vehicle. (B62B5/06)

SUMMARY OF INVENTION

The sanitary shopping cart handle cover is a sanitary structure. The sanitary shopping cart handle cover covers the handle of a cart. The handle of the cart is a horizontally oriented prism-shaped structure used to manually propel and navigate the cart. The sanitary shopping cart handle cover forms a sanitary barrier that prevents pathogens living on the handle with infecting a client using the cart. The sanitary shopping cart handle cover comprises a primary structure, a plurality of gloves, and a pocket. The plurality of gloves and the pocket attach to the primary structure. The primary structure covers the handle. The primary structure forms a barrier that prevents the transfer of a pathogen from the handle to a client. The pocket forms a sanitary storage structure that allows a client to store a domestic article without placing the domestic article within the containment space of the cart. The plurality of gloves are worn on the hands of the client. The plurality of gloves form personal barriers that prevent the pathogens from reaching the hands of the client.

These together with additional objects, features and advantages of the sanitary shopping cart handle cover will be readily apparent to those of ordinary skill in the art upon reading the following detailed description of the presently preferred, but nonetheless illustrative, embodiments when taken in conjunction with the accompanying drawings.

In this respect, before explaining the current embodiments of the sanitary shopping cart handle cover in detail, it is to be understood that the sanitary shopping cart handle cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the sanitary shopping cart handle cover.

It is therefore important that the claims be regarded as including such equivalent construction insofar as they do not depart from the spirit and scope of the sanitary shopping cart handle cover. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
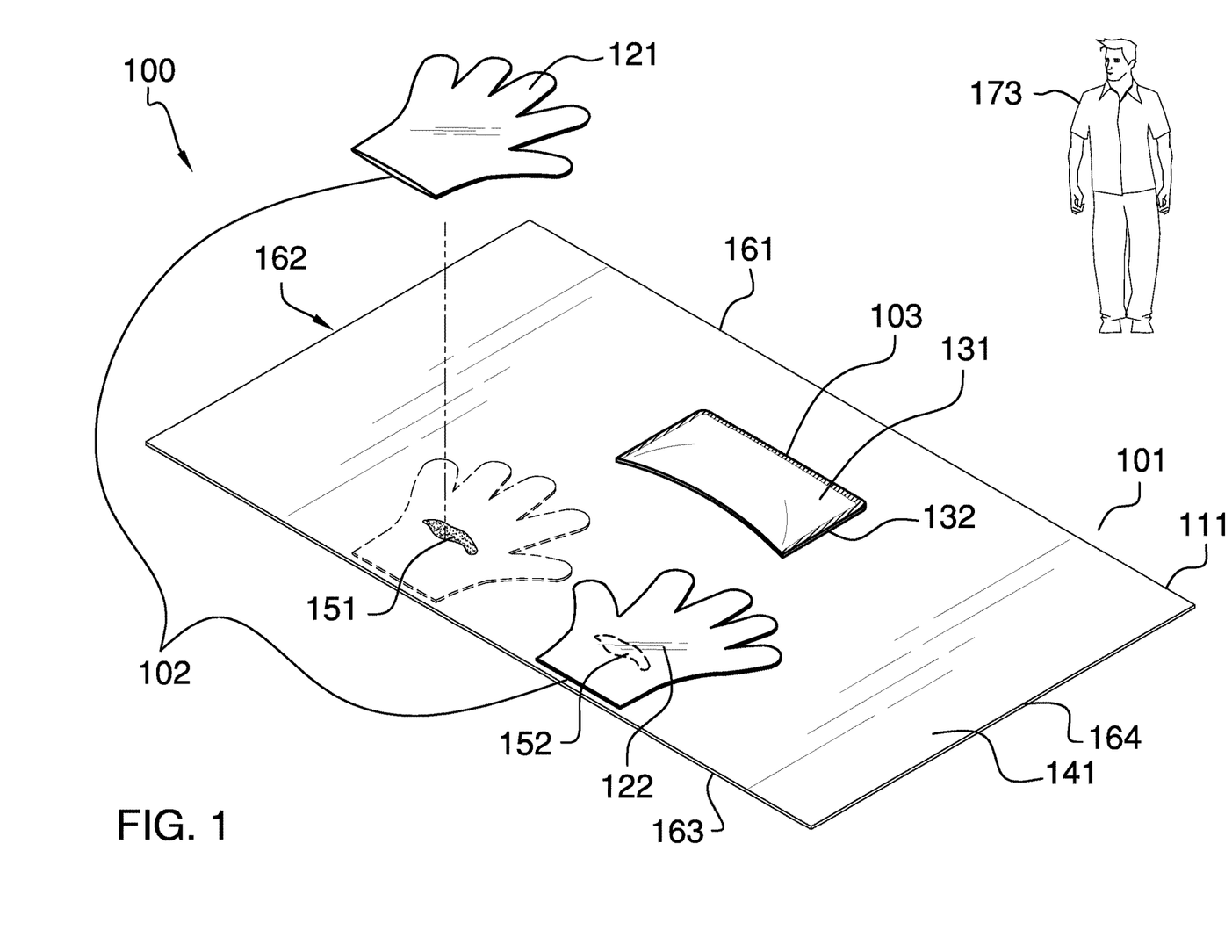
FIG. 1 is a perspective view of an embodiment of the disclosure.
Figure 2:
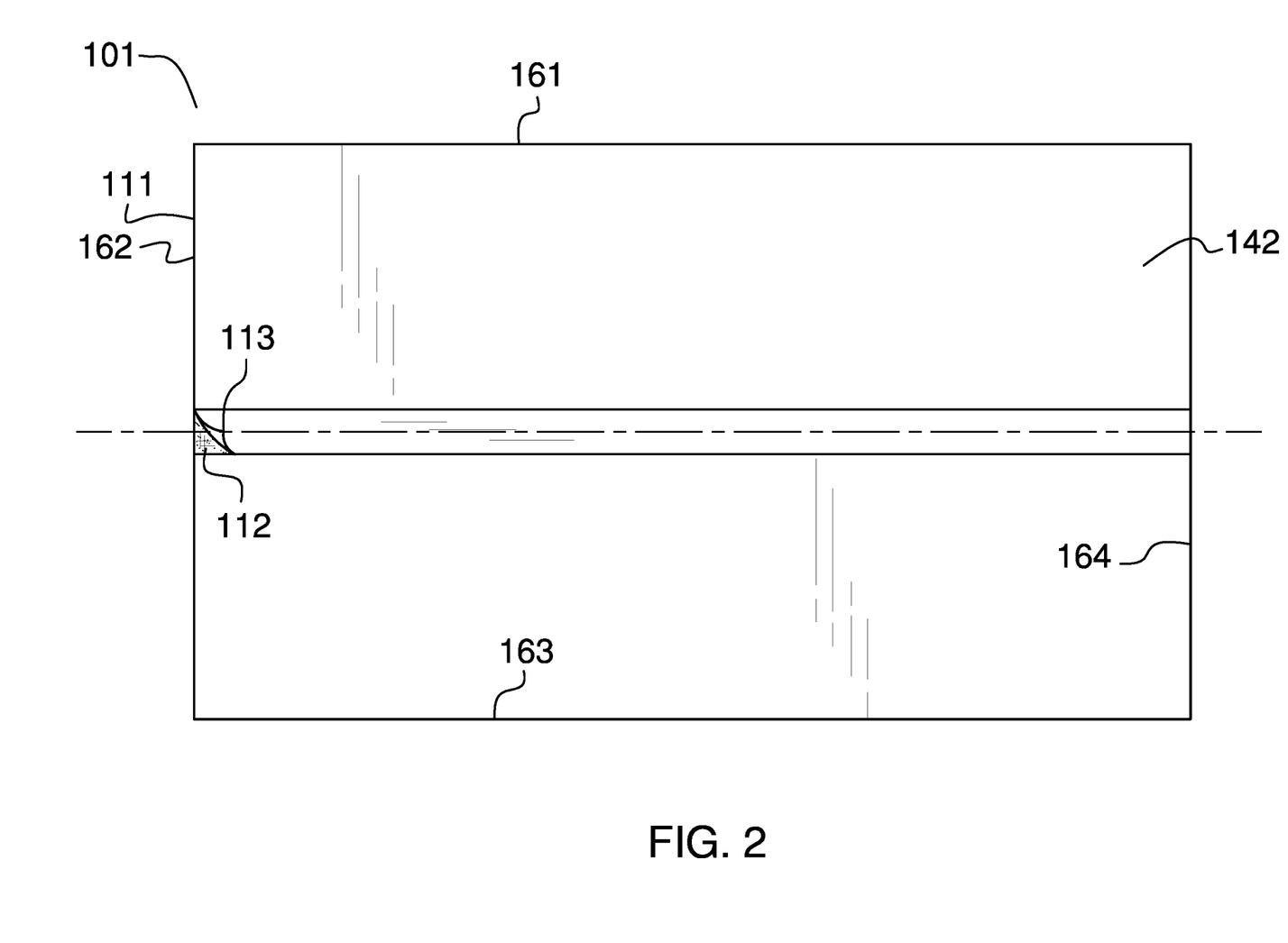
FIG. 2 is a rear view of an embodiment of the disclosure.
Figure 3:
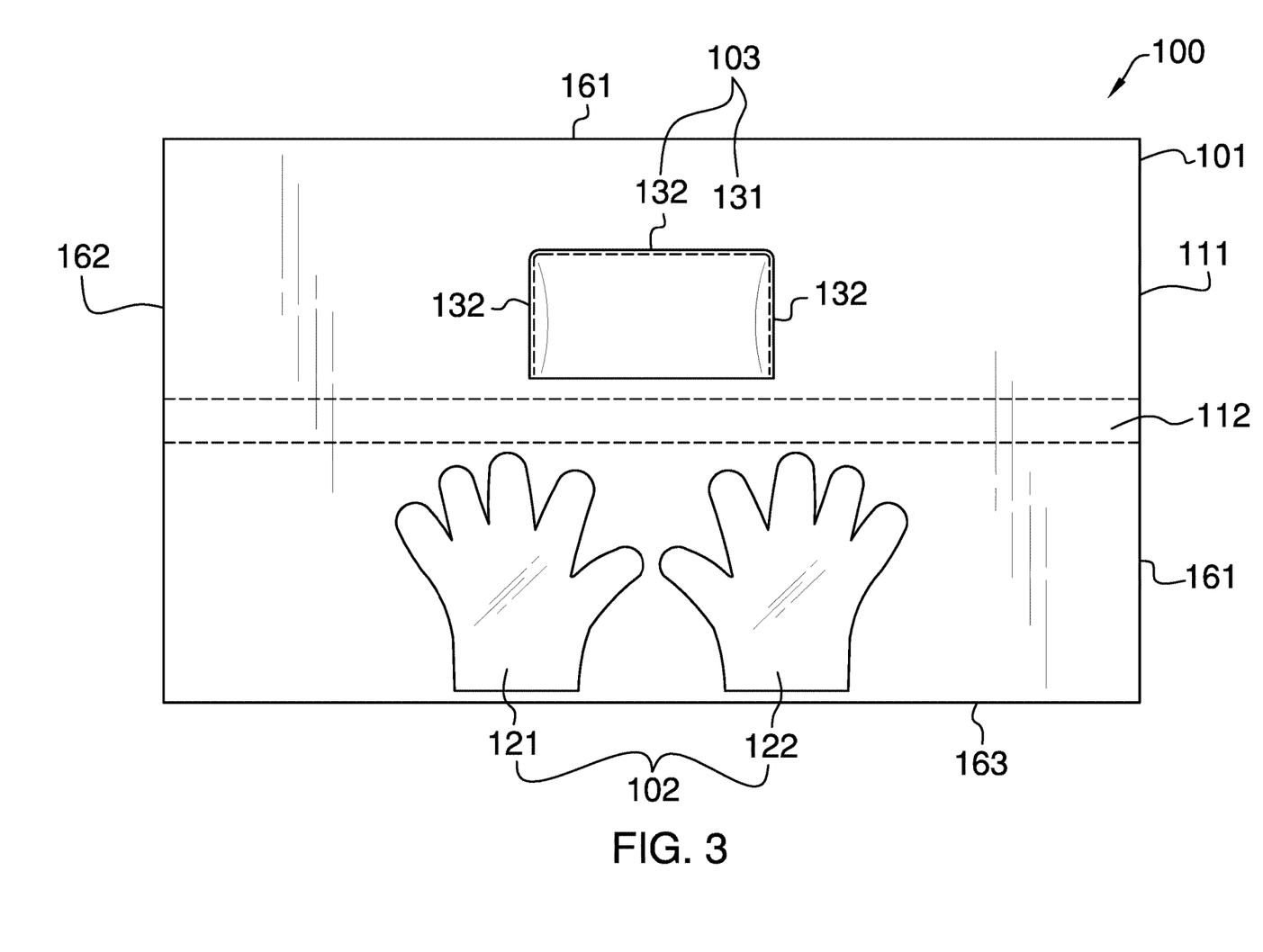
FIG. 3 is a front view of an embodiment of the disclosure.
Figure 4:
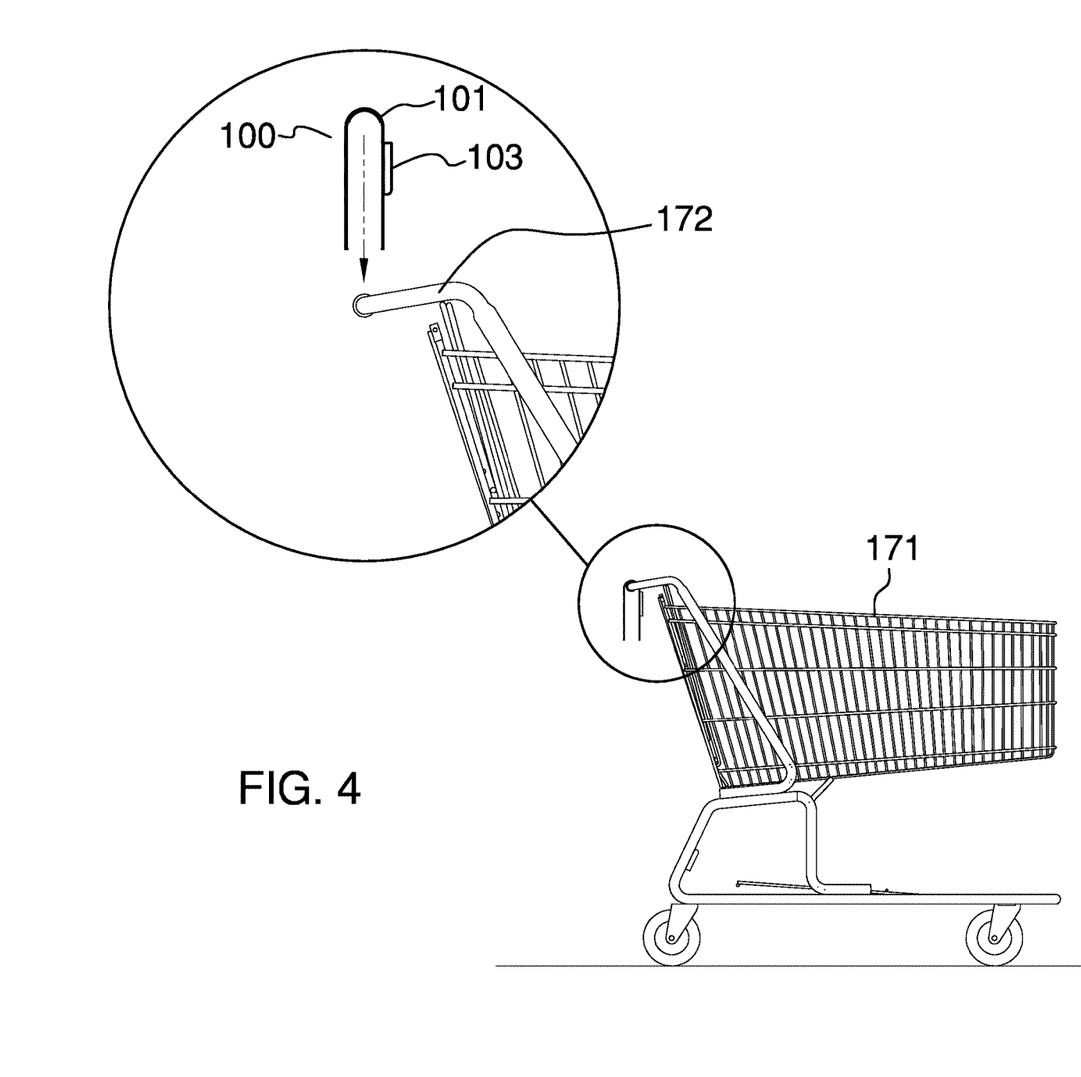
FIG. 4 is an in-use view of an embodiment of the disclosure.

Detailed reference will now be made to one or more potential embodiments of the disclosure, which are illustrated in FIGS. 1 through 4.

The sanitary shopping cart handle cover 100 (hereinafter invention) is a sanitary structure. The invention 100 covers the handle 172 of a cart 171. The handle 172 of the cart 171 is a horizontally oriented prism-shaped structure used to manually propel and navigate the cart 171. The invention 100 forms a sanitary barrier that prevents pathogens living on the handle 172 with infecting a client 173 using the cart 171. The cart 171 is defined elsewhere in this disclosure. The handle 172 is defined elsewhere in this disclosure. The client 173 is defined elsewhere in this disclosure.

The invention 100 comprises a primary structure 101 a plurality of gloves 102, and a pocket 103. The plurality of gloves 102 and the pocket 103 attach to the primary structure 101. The primary structure 101 covers the handle 172. The primary structure 101 forms a barrier that prevents the transfer of a pathogen from the handle 172 to a client 173. The pocket 103 forms a sanitary storage structure that allows a client 173 to store a domestic article without placing the domestic article within the containment space of the cart 171. The plurality of gloves 102 are worn on the hands of the client 173. The plurality of gloves 102 form personal barriers that prevent the pathogens from reaching the hands of the client 173.

The primary structure 101 forms a barrier between the client 173 and pathogens on the handle 172 of the cart 171. The primary structure 101 removably attaches to the handle 172 of the cart 171. The primary structure 101 is a sheeting structure. In the first potential embodiment of the disclosure, the primary structure 101 is formed from paper. The primary structure 101 comprises a master sheeting 111 and a master adhesive 112.

The master sheeting 111 is a sheeting. The master sheeting 111 is formed from paper. The master sheeting 111 has a rectangular shape. The master sheeting 111 forms the physical barrier that attaches to the handle 172 of the cart 171. The master sheeting 111 further comprises a first face 141, a second face 142, a first edge 161, a second edge 162, a third edge 163, and a fourth edge 164.

The first face 141 is the face of the sheeting structure of the master sheeting 111 with the greatest surface area. The second face 142 is the face of the sheeting structure of the master sheeting 111 that is distal from the first face 141.

The first edge 161 is the edge of the perimeter of the master sheeting 111 with the greatest span of length. The second edge 162 is the edge of the perimeter of the master sheeting 111 with the least span of length. The third edge 163 is the edge of the perimeter of the master sheeting 111 that is distal from the first edge 161. The fourth edge 164 is the edge of the perimeter of the master sheeting 111 that is distal from the second edge 162.

The corner formed by the first edge 161 and the fourth edge 164 roughly forms a right angle. The corner formed by the first edge 161 and the second edge 162 roughly forms a right angle. The corner formed by the second edge 162 and the third edge 163 roughly forms a right angle. The corner formed by the third edge 163 and the fourth edge 164 roughly forms a right angle.

The major axis of the rectangular structure of the master sheeting 111 is a line formed from the center point of the second edge 162 to the center point of the fourth edge 164. The major axis of the rectangular structure of the master sheeting 111 runs from the center point of the second edge 162 to the center point of the fourth edge 164. The major axis of the rectangular structure of the master sheeting 111 is roughly parallel to the first edge 161. The major axis of the rectangular structure of the master sheeting 111 is roughly parallel to the third edge 163. The major axis of the rectangular structure of the master sheeting 111 is roughly perpendicular to the second edge 162. The major axis of the rectangular structure of the master sheeting 111 is roughly perpendicular to the fourth edge 164.

The master adhesive 112 removably attaches the master sheeting 111 to the handle 172 of the cart 171. The master adhesive 112 is a chemical substance that forms an adhesive. The master adhesive 112 is a removable adhesive. The adhesive and the removable adhesive are defined elsewhere in this disclosure. The master adhesive 112 is applied as a coating to a portion of the second face 142 of the master sheeting 111. The master adhesive 112 is applied in a rectangular shape on the second face 142.

The major axis of the rectangular structure of the master adhesive 112 is parallel to the major axis of the rectangular structure of the master sheeting 111. The major axis of the rectangular structure of the master adhesive 112 aligns with the major axis of the rectangular structure of the master sheeting 111 such that the center of the rectangular structure of the master adhesive 112 aligns with the center of the rectangular structure of the master sheeting 111.

The master adhesive 112 is a pressure sensitive adhesive. To attach the master sheeting 111 to the handle 172 of the cart 171, the master sheeting 111 is laid on the handle 172 such that the major axis of the master adhesive 112 is aligned with the major axis of the handle 172. The master sheeting 111 is then pressed against the handle 172 to activate the master adhesive 112.

The parchment cover 113 is a parchment sheeting. The parchment cover 113 has a rectangular shape. The parchment cover 113 is geometrically identical to the form factor of the master adhesive 112. The parchment cover 113 lays on the exterior surface of the master adhesive 112 when the invention 100 is in storage.

The master adhesive 112 further comprises a parchment cover 113. The master adhesive 112 is sandwiched between the parchment cover 113 and the master sheeting 111. The parchment cover 113 is positioned such that the parchment cover 113 fully encloses the master adhesive 112. The parchment cover 113 is a sacrificial structure that prevents dirt and chemicals from reaching the master adhesive 112 during storage.

Each of the plurality of gloves 102 is worn on a hand of the client 173. Each of the plurality of gloves 102 forms a barrier between the hands of the client 173 and the surfaces of objects in the vicinity of the client 173. The plurality of gloves 102 removably attach to the first face 141 of the master sheeting 111. The plurality of gloves 102 comprises a first glove 121 and a second glove 122.

The first glove 121 is a glove. The first glove 121 is worn on a hand of the client 173. The second glove 122 is a glove. The second glove 122 is worn on a hand of the client 173 that is not protected by the first glove 121. The glove is defined elsewhere in this disclosure. The first glove 121 and the second glove 122 are attached to the first face 141 of the master sheeting 111. The first glove 121 and the second glove 122 are removed from the master sheeting 111 during the use of the invention 100. The first glove 121 and the second glove 122 removably attach to the first face 141 of the master sheeting 111.

The first glove 121 further comprises a first removable adhesive 151. The second glove 122 further comprises a second removable adhesive 152. The first removable adhesive 151 is a chemical substance that forms an adhesive. The first removable adhesive 151 is a removable adhesive. The adhesive and the removable adhesive are defined elsewhere in this disclosure. The first removable adhesive 151 secures the first glove 121 to the first face 141 of the master sheeting 111. The second removable adhesive 152 is a chemical substance that forms an adhesive. The second removable adhesive 152 is a removable adhesive. The adhesive and the removable adhesive are defined elsewhere in this disclosure. The second removable adhesive 152 secures the second glove 122 to the first face 141 of the master sheeting 111.

The pocket 103 is a storage space formed on the primary structure 101. The storage space formed by the pocket 103 is segregated from the storage space provided by the cart 171. The pocket 103 permanently attaches to the first face 141 of the master sheeting 111. The pocket 103 comprises a pocket 103 sheeting 131 and a pocket 103 adhesive 132.

The pocket 103 sheeting 131 is a sheeting. The pocket 103 sheeting 131 is formed from paper. The pocket 103 sheeting 131 has a rectangular shape. The pocket 103 sheeting 131 attaches to the first face 141 of the master sheeting 111. The pocket 103 sheeting 131 attaches to the master sheeting 111 such that a domestic article can be sandwiched between the pocket 103 sheeting 131 and the master sheeting 111. Specifically, a domestic article will slip in between the pocket 103 sheeting 131 and the master sheeting 111. The pocket 103 adhesive 132 is a chemical substance that forms an adhesive. The adhesive is defined elsewhere in this disclosure. The pocket 103 adhesive 132 permanently adheres three edges of the rectangular shape of the pocket 103 sheeting 131 to the first face 141 of the master sheeting 111. The unadhered edge of the pocket 103 sheeting 131 provides the access to the storage space of the pocket 103.

The following definitions were used in this disclosure:

Adhesive: As used in this disclosure, an adhesive is a chemical substance that can be used to adhere two or more objects to each other. Types of adhesives include, but are not limited to, epoxies, polyurethanes, polyimides, or cyanoacrylates, silicone, or latex based adhesives.

Cart: As used in this disclosure, a cart is small vehicle intended to be moved by a person. A synonym for cart is hand cart.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Client: As used in this disclosure, a client is an individual who is designated to receive the services of the disclosure at bar.

Correspond: As used in this disclosure, the term correspond is used as a comparison between two or more objects wherein one or more properties shared by the two or more objects match, agree, or align within acceptable manufacturing tolerances.

Exterior: As used in this disclosure, the exterior is used as a relational term that implies that an object is not contained within the boundary of a structure or a space.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Glove: As used in this disclosure, a glove is an item of apparel that covers a hand. The glove comprises five finger stalls into which the fingers of the hand are inserted. The glove further comprises the trank which encloses the hand form the fingers to the wrist. A glove is further defined with a palm side and a back side. The palm side is proximal to the palm of the hand. The back side is distal from the palm side.

Grip: As used in this disclosure, a grip is an accommodation formed on or within an object that allows the object to be grasped or manipulated by a hand.

Hand: As used in this disclosure, the hand is the extremity of the arm. The hand attaches to the wrist at the end that is distal from the shoulder. The hand comprises a plurality of metacarpal bones and a plurality of phalange bones.

Handle: As used in this disclosure, a handle is an object by which a tool, object, or door is held or manipulated with the hand.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the structure. The major and minor axes intersect at the center of the structure. The major axis is always parallel to the longest edge of a rectangular structure.

Microorganism: As used in this disclosure, a microorganism is an organism too small to be viewed by the unaided eye. Microorganisms are typically single celled organisms such as bacteria, yeast, viruses, protozoa, fungi and algae. A pathogen refers to a microorganism that has the potential to cause illness or disease.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction. In a one to one correspondence, the first element of the first set is said to be associated to the second element of the second set to which the first element corresponds.

Paper: As used in this disclosure, paper refers to a sheeting material commonly used as: a) a substrate on which people write; b) a substrate on which images are displayed; and, c) wrapping items. Paper is typically made from plant fibers such as cellulose. Paper intend for specific purposes may be made from other materials.

Parchment: As used in this disclosure, parchment refers to a silicone impregnated sheet of paper. Parchment is known for having high temperature resistance and for resisting saturation by a liquid.

Perimeter: As used in this disclosure, a perimeter is one or more curved or straight lines that bounds an enclosed area on a plane or surface. The perimeter of a circle is commonly referred to as a circumference.

Pocket: As used in this disclosure, a pocket is a small pouch or storage space that is formed on or into an object. Pockets are often formed by joining a second textile or a second sheeting to a first textile or a first sheeting, respectively, by sewing or heat sealing respectively. Methods to form pockets are well-known and documented in the textile and apparel arts.

Pressure Sensitive Adhesive: As used in this disclosure, a pressure sensitive adhesive is an adhesive that is a permanently tacky adhesive that is activated by the application of pressure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Removable Adhesive: As used in this disclosure, a removable adhesive is a commercially available adhesive that is designed with a lower tack, or stickiness, such that a first object is attached to a second object with a removable adhesive the first object can be readily removed in a manner that ideally, though not necessarily practically, leaves behind no adhesive residue on the second object. A repositionable adhesive is a subset of removable adhesives that are intended to allow the first object to be reattached to a third object or the second object in the initial or a different position. Within this disclosure, a removable adhesive is assumed to include repositionable adhesives. A removable adhesive is often called fugitive glue.

Roughly: As used in this disclosure, roughly refers to a comparison between two objects. Roughly means that the difference between one or more parameters of the two compared objects are not significantly different.

Sacrificial Structure: As used in this disclosure, a sacrificial structure is a first object or structure that protects a second object or structure from damage. More specifically, the sacrificial structure protects the second object or structure by being damaged instead of the second object or structure.

Sandwich: As used in this disclosure, to sandwich means to insert a first disk-shaped structure between a second disk-shaped structure and a third disk-shaped structure to form a composite prism structure. Specifically: a) a first congruent end of the first disk-shaped structure is placed against a first interior congruent end of the second disk-shaped structure; and, b) a second congruent end of the first disk-shaped structure is placed against a second interior congruent end of the third disk-shaped structure. A first exterior congruent end of the second disk-shaped structure forms a first overall congruent end of the overall composite prism structure described in this definition. A second exterior congruent end of the third disk-shaped structure forms a second overall congruent end of the overall composite prism structure described in this definition. The second overall congruent end of the overall composite prism structure is distal from the first overall congruent end. The verb to sandwich describes the act of placing the second disk-shaped structure between the first disk-shaped structure and the third disk-shaped structure.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Silicone: As used in this disclosure, silicone is a substance formed from silicon (Si) and oxygen (O) that forms the backbone of polymer type chains similar to polymers that are formed by carbon. Though exceptions do exist, silicone is generally considered to be less reactive and to have better heat resistance when compared to most common carbon based polymers.

Superior: As used in this disclosure, the term superior refers to a directional reference that is parallel to and in the opposite direction of the force of gravity when an object is positioned or used normally.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventors claim:

1. A sanitary cart handle comprising
a primary structure, a plurality of gloves, and a pocket;
wherein the plurality of gloves and the pocket attach to the primary structure;
wherein the sanitary cart handle is a sanitary structure;
wherein the sanitary cart handle covers a handle of a cart;
wherein the handle of the cart is a horizontally oriented structure;
wherein the sanitary cart handle forms a sanitary barrier that encloses the handle.

2. The sanitary cart handle according to claim 1
wherein the primary structure removably attaches to the handle of the cart;
wherein the primary structure covers the handle;
wherein the primary structure forms a barrier that prevents a transfer of a pathogen from the handle;
wherein the pocket forms a sanitary storage structure that stores a domestic article.

3. The sanitary cart handle according to claim 2
wherein the plurality of gloves are adapted to be worn on hands of a client;
wherein the plurality of gloves are adapted to form personal barriers that prevent the pathogens from reaching the hands of said client;
wherein the plurality of gloves removably attach to a master sheeting.

4. The sanitary cart handle according to claim 3
wherein the pocket is a storage space formed on the primary structure;
wherein the storage space formed by the pocket is segregated from the storage space provided by the cart;
wherein the pocket permanently attaches to the master sheeting.

5. The sanitary cart handle according to claim 4
wherein the primary structure is a sheeting structure;
wherein the primary structure is formed from paper.

6. The sanitary cart handle according to claim 5
wherein the primary structure comprises a master sheeting and a master adhesive;
wherein the master adhesive is applied as a coating to a portion of the master sheeting.

7. The sanitary cart handle according to claim 6
wherein the plurality of gloves comprises a first glove and a second glove;
wherein the first glove is worn on a hand of the client;
wherein the second glove is worn on a hand of the client that is not protected by the first glove.

8. The sanitary cart handle according to claim 7
wherein the pocket comprises a pocket sheeting and a pocket adhesive;
wherein the pocket adhesive permanently adheres to three edges of the rectangular shape of the pocket sheeting to the master sheeting.

9. The sanitary cart handle according to claim 8
wherein the master sheeting is a sheeting;
wherein the master sheeting is formed from paper;
wherein the master sheeting has a rectangular shape;
wherein the master sheeting forms the physical barrier that attaches to the handle of the cart.

10. The sanitary cart handle according to claim 9
wherein the master sheeting further comprises a first face, a second face, a first edge, a second edge, a third edge, and a fourth edge;
wherein the first face is the face of the sheeting structure of the master sheeting with the greatest surface area;
wherein the second face is the face of the sheeting structure of the master sheeting that is distal from the first face;
wherein the first edge is the edge of the perimeter of the master sheeting with the greatest span of length;
wherein the second edge is the edge of the perimeter of the master sheeting with the least span of length;
wherein the third edge is the edge of the perimeter of the master sheeting that is distal from the first edge;
wherein the fourth edge is the edge of the perimeter of the master sheeting that is distal from the second edge.

11. The sanitary cart handle according to claim 10
wherein the corner formed by the first edge and the fourth edge roughly forms a right angle;
wherein the corner formed by the first edge and the second edge roughly forms a right angle;
wherein the corner formed by the second edge and the third edge roughly forms a right angle;
wherein the corner formed by the third edge and the fourth edge roughly forms a right angle;
wherein the rectangular structure of the master sheeting comprises a major axis;
wherein the major axis of the rectangular structure of the master sheeting is a line formed from the center point of the second edge to the center point of the fourth edge;
wherein the major axis of the rectangular structure of the master sheeting runs from the center point of the second edge to the center point of the fourth edge;
wherein the major axis of the rectangular structure of the master sheeting is roughly parallel to the first edge;
wherein the major axis of the rectangular structure of the master sheeting is roughly parallel to the third edge;
wherein the major axis of the rectangular structure of the master sheeting is roughly perpendicular to the second edge;
wherein the major axis of the rectangular structure of the master sheeting is roughly perpendicular to the fourth edge.

12. The sanitary cart handle according to claim 11
wherein the master adhesive removably attaches the master sheeting to the handle of the cart;
wherein the master adhesive is a chemical substance that forms an adhesive;
wherein the master adhesive is a removable adhesive.

13. The sanitary cart handle according to claim 12
wherein the master adhesive is applied as a coating to a portion of the second face of the master sheeting;
wherein the master adhesive is applied in a rectangular shape on the second face;
wherein the major axis of the rectangular structure of the master adhesive is parallel to the major axis of the rectangular structure of the master sheeting;
wherein the major axis of the rectangular structure of the master adhesive aligns with the major axis of the rectangular structure of the master sheeting such that the center of the rectangular structure of the master adhesive aligns with the center of the rectangular structure of the master sheeting.

14. The sanitary cart handle according to claim 13
wherein the master adhesive is a pressure sensitive adhesive;
wherein to attach the master sheeting to the handle of the cart, the master sheeting is laid on the handle such that the major axis of the master adhesive is aligned with the major axis of the handle;
wherein the master sheeting is then pressed against the handle to activate the master adhesive.

15. The sanitary cart handle according to claim 14
wherein the master adhesive further comprises a parchment cover;
wherein the parchment cover is a parchment sheeting;
wherein the parchment cover has a rectangular shape;
wherein the parchment cover is geometrically identical to the form factor of the master adhesive;
wherein the parchment cover lays on the exterior surface of the master adhesive when the sanitary cart handle is in storage;
wherein the master adhesive is sandwiched between the parchment cover and the master sheeting;
wherein the parchment cover is positioned such that the parchment cover fully encloses the master adhesive.

16. The sanitary cart handle according to claim 15
wherein the plurality of gloves removably attach to the first face of the master sheeting.

17. The sanitary cart handle according to claim 16
wherein the first glove is a glove;

wherein the second glove is a glove;
wherein the first glove and the second glove are attached to the first face of the master sheeting;
wherein the first glove and the second glove are removed from the master sheeting during the use of the sanitary cart handle.

18. The sanitary cart handle according to claim 17
wherein the first glove and the second glove removably attach to the first face of the master sheeting;
wherein the first glove further comprises a first removable adhesive;
wherein the second glove further comprises a second removable adhesive;
wherein the first removable adhesive is a chemical substance that forms an adhesive;
wherein the first removable adhesive is a removable adhesive;
wherein the adhesive and the removable adhesive are defined elsewhere in this disclosure;
wherein the first removable adhesive secures the first glove to the first face of the master sheeting;
wherein the second removable adhesive is a chemical substance that forms an adhesive;
wherein the second removable adhesive is a removable adhesive;
wherein the second removable adhesive secures the second glove to the first face of the master sheeting.

19. The sanitary cart handle according to claim 18
wherein the pocket sheeting is a sheeting;
wherein the pocket sheeting is formed from paper;
wherein the pocket sheeting has a rectangular shape;
wherein the pocket sheeting attaches to the first face of the master sheeting.

20. The sanitary cart handle according to claim 19
wherein the pocket adhesive is a chemical substance that forms an adhesive;
wherein the pocket adhesive permanently adheres three edges of the rectangular shape of the pocket sheeting to the first face of the master sheeting;
wherein the unadhered edge of the pocket sheeting provides access to the storage space of the pocket.

* * * * *